US009022151B2

(12) United States Patent
Lee et al.

(10) Patent No.: US 9,022,151 B2
(45) Date of Patent: May 5, 2015

(54) MULTI-LEGGED WALKING APPARATUS

(75) Inventors: Sang-Won Lee, Gyeonggi-do (KR); Kwan-Young Joung, Gyeonggi-do (KR); Jin-Young Kim, Gyeonggi-do (KR); O-Hung Kwon, Seoul (KR)

(73) Assignee: Korea Institute of Indistrial Technology, Chungcheongnam-Do (KR)

( * ) Notice: Subject to any disclaimer, the term of this patent is extended or adjusted under 35 U.S.C. 154(b) by 140 days.

(21) Appl. No.: 13/703,786

(22) PCT Filed: Nov. 16, 2011

(86) PCT No.: PCT/KR2011/008756
§ 371 (c)(1),
(2), (4) Date: Dec. 12, 2012

(87) PCT Pub. No.: WO2012/081841
PCT Pub. Date: Jun. 21, 2012

(65) Prior Publication Data
US 2013/0087392 A1   Apr. 11, 2013

(30) Foreign Application Priority Data

Dec. 15, 2010   (KR) .......................... 10-2010-0128012

(51) Int. Cl.
*B62D 57/032*   (2006.01)

(52) U.S. Cl.
CPC .................................... *B62D 57/032* (2013.01)

(58) Field of Classification Search
CPC .................................................... B62D 57/032
USPC .............. 180/8.6, 8.1, 8.5, 7.1, 194, 8.2, 383;
464/54, 57, 69, 70, 77, 89, 97, 160,
464/161, 61; 152/105, 106, 107, 97;
280/10, 5.26, 5.28; 305/1, 4, 5
See application file for complete search history.

(56) References Cited

U.S. PATENT DOCUMENTS

| | | | | |
|---|---|---|---|---|
| 4,503,924 A | * | 3/1985 | Bartholet et al. | .............. 180/8.6 |
| 6,458,010 B1 | | 10/2002 | Yamagishi et al. | |
| 6,478,314 B1 | * | 11/2002 | Klann | .......................... 280/28.5 |
| 6,708,068 B1 | | 3/2004 | Sakaue | |
| 2002/0179342 A1 | * | 12/2002 | Quinn et al. | ................... 180/8.1 |

FOREIGN PATENT DOCUMENTS

| | | |
|---|---|---|
| EP | 1 072 365 A1 | 1/2001 |
| JP | 11-90035 A | 4/1999 |
| JP | 2005-144582 A | 6/2005 |

(Continued)

*Primary Examiner* — Joseph Rocca
*Assistant Examiner* — Jacob Knutson
(74) *Attorney, Agent, or Firm* — Rabin & Berdo, P.C.

(57) ABSTRACT

A multi-legged apparatus enables a multi-legged robot to provide a natural motion, and includes a body portion comprising a body, a front leg portion comprising a front fixing portion fixed to the body, and a front rotating portion rotatably connected to the front fixing portion, a rear leg portion connected to the body and a rear leg portion comprising a rear rotating portion rotatably connected to the rear fixing portion, and a first link rotatably connected, at both ends, to the front and rear rotating portions, respectively. The body portion additionally includes a driving portion which rotates one of the front and rear rotating portions. By employing the first link and the driving portion, the body of the multi-legged robot is moved to and fro and left and right naturally in accordance with the movement of the legs, in a similar pattern as that generally shown in actual multi-legged animals.

13 Claims, 3 Drawing Sheets

(56) References Cited

FOREIGN PATENT DOCUMENTS

| KR | 10-2009-0002417 A | 1/2009 |
| KR | 20-2009-0007105 | 7/2009 |
| KR | 10-2010-0083354 A | 7/2010 |

* cited by examiner ically moves a portion of the up-down portion connected to the other side of the connecting member.

The multi-legged apparatus may include two second links, wherein one of the two second links may be connected at both ends to a left side of the other side of the connecting member and to a left side of the front rotating portion, and the other of the two second links may be connected at both ends to a right side of the other side of the connecting member and to a right side of the front rotating portion.

The connecting member may include a shaft member extended vertically from the other side, and the up-down portion may include a rotating member which is rotatably connected to both ends of the shaft member to be rotated in a vertical direction.

The up-down portion may include a first up-down member rotatably connected at one end to a upper end of the rotating member to be rotated in a lateral direction, a second up-down member rotatably connected at one end to a lower end of the rotating member to be rotated in a lateral direction, and a supporting member rotatably connected to the other end of the first up-down member to be rotated in a lateral direction and connected to an intermediate portion of the second up-down member to be rotated in a lateral direction. The up-down driving portion may be rotatably connected at one end top the other end of the second up-down member to be rotated in a lateral direction, and be rotatably connected at the other end to the supporting member to be rotated in a lateral direction.

The supporting member may be connected to the first and second up-down members so that the first and second up-down members are arranged side by side.

The second up-down member may include a damper connected to the supporting member.

The up-down driving portion may include a hydraulic actuator.

The front rotating portion may be rotatable in a lateral direction with respect to the front fixing portion, the rear rotating portion may be rotatable in a lateral direction with respect to the rear fixing portion, and the driving portion may be rotatable in a lateral direction with respect to one of the front and rear rotating portions.

According to the embodiments, by employing the first link and the driving portion, the body of the multi-legged robot is moved to and fro and left and right naturally in accordance with the movement of the legs during operation, in a similar walking pattern as that generally shown in actual multi-legged walking animals.

MULTI-LEGGED WALKING APPARATUS

CROSS-REFERENCE TO RELATED APPLICATIONS

This application claims priority from Korean Patent Application No. 10-2010-0128012, filed on Dec. 15, 2010, in the Korean Intellectual Property Office, the disclosure of which is incorporated herein by reference in its entirety.

BACKGROUND

1. Field of the Invention

The present invention relates to an apparatus for providing a motion similar to natural movement of a multi-legged animal.

2. Description of the Related Art

Robotics is the technical field that studies intensely on human or animal walking behavior. Generally, human or animal walking is categorized into biped, multi-legged, and multi-articulated walking, depending on the form and pattern of the walking employed. A study on a human model-based robot is mostly focused on the biped walking, while a study on an animal model-based robot is focused on the multi-legged or quadruped walking.

A multi-legged walking robot models after the articulation or walking form of digitigrades which moves on legs, which is considered the most stable and fast way of walking by the researchers of the field of walking robots. However, the conventional multi-legged walking robot is generally focused on the legs and designed at the biomimetics level. Therefore, lack of consideration of the entire walking pattern causes unsmooth movement between a body and legs.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one embodiment, a technical objective is to provide a multi-legged apparatus for providing more natural motion during operation of a multi-legged robot, by taking into consideration the overall walking pattern between a body and legs of the multi-legged robot.

In one embodiment, a multi-legged apparatus is provided, which may include a body portion comprising a body, a front leg portion comprising a front fixing portion fixed to the body, and a front rotating portion rotatably connected to the front fixing portion, a rear leg portion connected to the body and a rear leg portion comprising a rear rotating portion rotatably connected to the rear fixing portion, and a first link rotatably connected, at both ends, to the front and rear rotating portions, respectively, wherein the body portion may include a driving portion which rotates one of the front and rear rotating portions.

The driving portion may include a link portion comprising a connecting member rotatably connected at one end to the body to be rotated in a lateral direction, and a second link rotatably connected at one end to the other side of the connecting member and rotatably connected at the other end to one of the front and rear rotating portions, a up-down portion rotatably connected to the other side of the connecting member to be rotated in a vertical direction, and a up-down driving

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
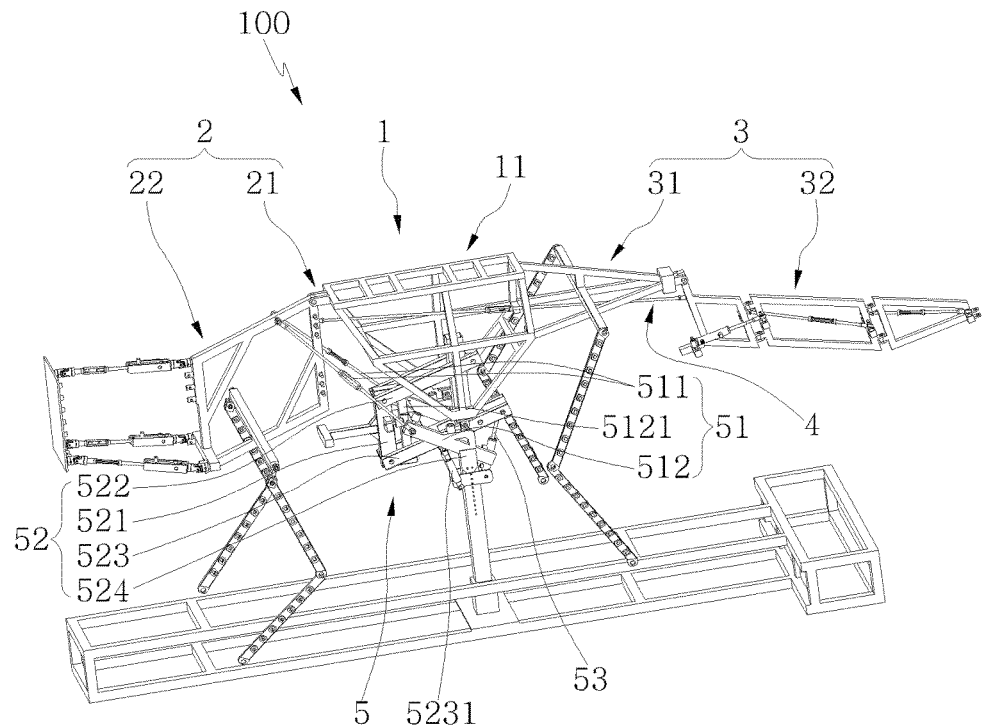
FIG. 1 is a perspective view of a multi-legged robot having a multi-legged apparatus according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Figure 2:
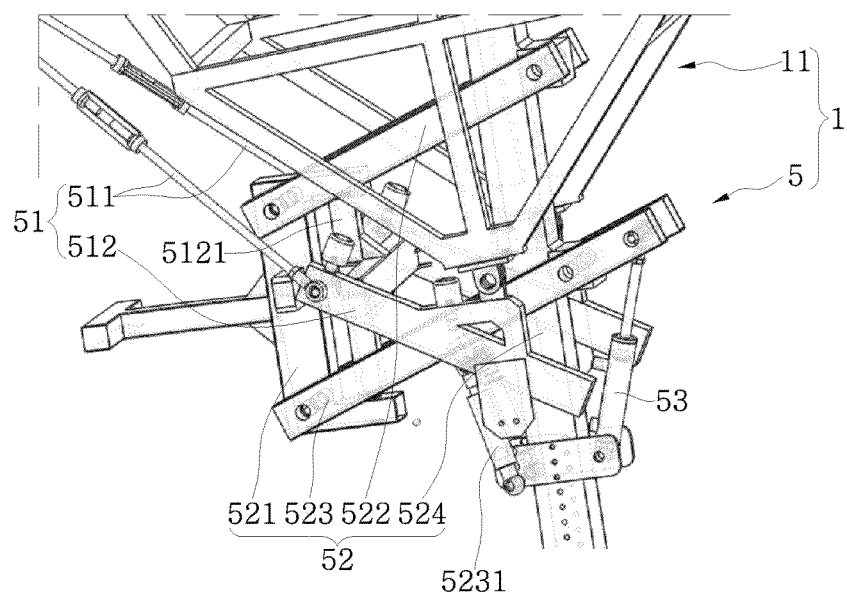
FIG. 2 illustrates, three-dimensionally, a driving portion of a multi-legged apparatus in enlargement, according to an embodiment.

FIG. 1 is a perspective view of a multi-legged robot having a multi-legged apparatus according to an embodiment, and FIG. 2 illustrates, three-dimensionally, a driving portion of a multi-legged apparatus in enlargement, according to an embodiment.

Referring to FIGS. 1 and 2, a multi-legged apparatus 100 according to an embodiment includes a body portion 1, a front leg portion 2, a rear leg portion 3 and a first link portion 4.

The body portion 1 will be first explained below.

Referring to FIGS. 1 and 2, the body portion 1 includes a body 11. The body 11 may be a body of the multi-legged robot, or any constitution connected to the body of the multi-legged robot. Accordingly, the multi-legged apparatus 100 according to an embodiment may not include the body of the multi-legged robot, in which case the multi-legged apparatus 100 may be mounted on the multi-legged robot.

Referring again to FIGS. 1 and 2, the body portion 1 additionally includes a driving portion 5 which rotates one of a front rotating portion 22 and a rear rotating portion 32. In one example, the driving portion 5 may be rotatably connected to the body 11 as illustrated in FIGS. 1 and 2. The driving portion 5 will be explained in detail below after completely explaining about the front leg portion 2, rear leg portion 3 and a first link 4.

Next, the front leg portion 2 and the rear leg portion 3 will be explained.

Referring to FIG. 1, the front leg portion 2 includes a front fixing portion 21, and a front rotating portion 22 rotatably connected to the front fixing portion 21. The front fixing portion 21 may be fixed on the body 11 with a limited freedom of motion and rotation. Further, the front rotating portion 22 may be connected to the front fixing portion 21 via a hinge portion.

Referring again to FIG. 1, the rear leg portion 3 includes a rear fixing portion 31 and a rear rotating portion 32 rotatably connected to the rear fixing portion 31. Like the front fixing portion 21, the rear fixing portion 31 may also be fixed on the body 11 with a limited freedom of motion and rotation. Further, the rear rotating portion 32 may be connected to the rear fixing portion 31 via a hinge portion. Considering that the front fixing portion 21 and the rear fixing portion 31 are fixed on the body 11, respectively, the front rotating portion 22 and the rear rotating portion 32 are rotatable with respect to the body 11.

For example, referring to FIG. 1, the front rotating portion 22 may rotate in a lateral direction with respect to the front fixing portion 21, while the rear rotating portion 32 may be rotatable in a lateral direction with respect to the rear fixing portion 31. In other words, the front rotating portion 22 may rotate vertically with respect to the front fixing portion 21, while the rear rotating portion 32 may rotate vertically with respect to the rear fixing portion 31. Further, since the front and rear fixing portions 21, 31 are fixed on the body 1, respectively, the front and rear rotating portions 22, 32 are deemed rotatable vertically with respect to the body 11, respectively.

Referring to FIG. 1, the driving portion 5 is connected to the front rotating portion 22 which is capable of rotating the front rotating portion 22 vertically. However, depending on needs, the driving portion 5 may be connected to the rear rotating portion 32. That is, the driving portion 5 of the body portion 1 may be rotated in a lateral direction with respect to one of the front and rear rotating portions 22, 32.

The first link 4 will be explained below.

Referring to FIG. 1, both ends of the first link 4 are connected to the front and rear rotating portions 22, 32. According to the connection by the first link 4, when one of the front and rear rotating portions 22, 32 is rotated by the driving portion 5, the other one of the front and rear rotating portions 22, 32 also rotates accordingly.

By way of example, the first link 4 may be rotatably connected at both ends to the front and rear rotating portions 22, 32, respectively, to be rotated in a lateral direction. Further, to ensure a more natural motion, the first link 4 may be expanded and constricted with a predetermined degree of elasticity, in a lengthwise direction. Further, depending on needs, both ends of the first link 4 may be fixedly connected to the front and rear rotating portions 22, 32, and both ends of the first link 4 may be rotatably connected to the front and rear rotating portions 22, 32 via ball joint or the like, to be rotated omnidirectionally.

Next, the driving portion 5 employed in the body portion 1 will be explained.

Referring to FIGS. 1 and 2 (and mainly, to FIG. 2), the driving portion 5 may include a link portion 51, a up-down moving portion 52 and a up-down driving portion 53.

The link portion 51 may include a connecting member 512 of which one side is rotatably connected to the body 11 to be rotated in a lateral direction, and a second link 511 of which one end is rotatably connected to the other side of the connecting member 512 and the other end is rotatably connected to one of the front and rear rotating portions 22, 32.

That is, with one side connected to the body 11 and the other side connected to the second link 511, the connecting member 512 can push or pull the second link 511 in accordance with the rotational motion thereof which is made when the other side of the connecting member 512 is vertically rotated on one side with respect to the body 11. Because the second link 511 is pushed or pulled in accordance with the rotation of the connecting member 512 as explained above, one of the front and rear rotating portions 22, 32 rotatably connected to the second link 511 is also pushed or pulled in a rotary motion. For reference, the rotation of the connecting member 512 may be implemented by the up-down driving portion 53 to be explained below.

Referring to FIG. 1, because the second link 511 is connected to the front rotating portion 22, according to the up-down movement of the other side of the connecting member 512 by the up-down driving portion 53, the front rotating portion 22 is rotated in accordance with the motion of the second link 511 connected to the other side of the connecting member 512, and the first link 4, connected to the front rotating portion 22, is moved in accordance with the rotation of the front rotating portion 22 to thereby cause the rear rotating portion 32, connected to the first link 4, to rotate.

Referring mainly to FIG. 2, the connecting member 512 may include a shaft member 5121 expanded vertically on the other side. The shaft member 5121 may be connected to the up-down moving portion 52 (to be explained) to be rotated within a predetermined angle and in a lateral direction, with respect to the lengthwise direction of the shaft member 5121. This will be explained in greater detail below with reference to the up-down moving portion 52.

The up-down moving portion 52 may be configured to elevate the link portion 51. To elevate the link portion 51, the up-down moving portion 52 may be connected to the up-down driving portion 53 to be explained below.

The up-down moving portion 52 may be rotatably connected to the other side of the connecting member 512 to be rotated in a vertical direction. Referring mainly to FIG. 2, the connecting member 512 may include the shaft member 5121 as explained above, and the up-down moving portion 52 may include a rotating member 521 connected rotatably to both ends of the shaft member 5121 to be rotated in a vertical direction. That is, the up-down moving portion 52 is rotated with respect to the link portion 51 via the rotating member 521 in a lateral direction.

As explained above, the up-down moving portion 52 may elevate the link portion 51, or rotated in a lateral direction with respect to the link portion 51.

Referring to FIGS. 1 and 2, the up-down moving portion 52 elevates the link portion 51, thereby causing the front rotating portion 22 connected to the link portion 51 to be rotated, and according to the rotation of the front rotating portion 22, the first link 4 is moved to rotate the rear rotating portion 32. When the multi-legged robot walks with the multi-legged apparatus 100 mounted thereon, the front and rear rotating portions 22, 32 connected to the first link 4 are rotated vertically within a predetermined angle to thus allow more natural motion of the multi-legged robot.

Further, because the up-down moving portion 52 is rotated laterally within a predetermined angle with respect to the link portion 51, during operation of the multi-legged robot with the multi-legged apparatus 100 mounted thereon, the robot has more natural twist motion in which the left (or upper-left) or right (or upper right) portion of the body twists every time the robot takes a step forward on its left front leg (rear leg) or on right front leg (rear leg). The body of the robot may twist above or below the direction of lateral rotation, depending on a direction the link portion 51 is connected to the front or rear rotating portion 22, 32.

Referring to FIGS. 1 and 2, there may be two second links 511. One of the two second links 511 may be connected, at its both ends, to the left side of the other side of the connecting member 512 and the left side of the front rotating portion 22, while the other one of the second link 511 may be connected, at its both ends, to the right side of the other side of the connecting member 512 and the right side of the front rotating portion 22. Accordingly, since two second links 511 are provided on the left and right sides of the front rotating portion 22, the front rotating portion 22 can be rotatably connected with respect to the front fixing portion 21 so that lateral twist motion of the front rotating portion 22 is implemented.

Meanwhile, if the front rotating portion 22 is rotatably connected to be rotated in a lateral direction with respect to the front fixing portion 21, the lateral rotation may be limited within a predetermined angle that is allowed by the elasticity of the front leg portion 2.

Further, to ensure more natural motion, the second link 511 may be elastically expanded or constricted within a predetermined range along a lengthwise direction. The 'predetermined range' as used herein refers to a range that allows a predetermined absorption of the impact during operation of the multiple robot with the multi-legged apparatus 100 mounted thereon, according to the elastic extension and constriction of the second link 511, and that allows more natural twist motion. If the allowable elastic extension/constriction range is too high, load on the other components of the multi-legged apparatus 100 will increase. Accordingly, the range may preferably be set in advance, within which the respective components are under appropriately-distributed loads. Concerning the predetermined range, the similar concept of the first link 4 explained above may apply.

Referring to FIG. 2, the lower part of the up-down moving portion 52 will be explained in detail. That is, the up-down moving portion 52 may additionally include a first up-down moving member 522 rotatably connected at its one end to a upper end of the rotating member 521 to be rotated in a lateral direction, a second up-down moving member 523 connected at its one end rotatably to a lower end of the rotating member 521 to be rotated in a lateral direction, and a supporting member 524 connected rotatably to the other end of the first up-down moving member 522 to be rotated in a lateral direction, and connected rotatably to an intermediate portion of the second up-down moving member 523 to be rotated in a lateral direction. The supporting member 524 may be connected to the first and second up-down moving members 522, 523 so that the first and second up-down moving members 522, 523 are arranged side by side.

Referring to FIGS. 1 and 2, the second up-down moving member 523 may include a damper 5231 connected to the supporting member 524. The damper 5231, or shock absorber, may be connected at its both ends to the second up-down moving member 523 and the supporting member 524 to absorb vibration that can generate during driving of the up-down moving portion 52.

The up-down driving portion 53 may move the part of the up-down moving portion 52 that is connected to the other side of the connecting member 512 vertically. That is, one end of the up-down driving portion 53 may be rotatably connected to the other end of the second up-down moving member 523 to be rotated in a lateral direction, while the other end may be rotatably connected to the supporting member 524 to be rotated in a lateral direction. Further, the up-down driving portion 53 may be expandably and constrictably driven along the lengthwise direction.

In one example, the up-down driving portion 53 may be a hydraulic actuator.

The operation and effect of the multi-legged apparatus 100 according to an embodiment will be explained below with reference to the components explained above.

Figure 3:
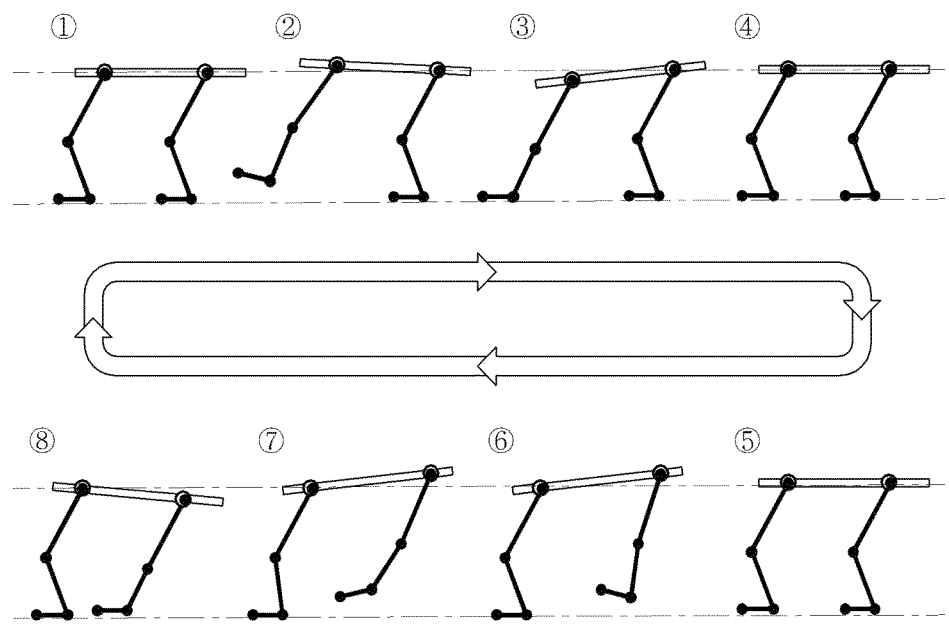
FIG. 3 is a schematic conceptual view illustrating, in stepwise manner, a motion of a multi-legged robot by a multi-legged apparatus according to an embodiment viewed from a side.

FIG. 3 is a schematic conceptual view illustrating, in stepwise manner, a motion of a multi-legged robot by a multi-legged apparatus according to an embodiment viewed from a side.

First, the up-down motion will be explained, which may be implemented on the multi-legged robot by the multi-legged apparatus 100 according to an embodiment. Referring to FIG. 3, when viewed from a side, the motion of the multi-legged robot may be categorized into positions ①~⑧.

Referring to change from position ① to position ② where the robot raises its front legs, the up-down driving portion 53 constricts in a lengthwise direction, to thus pull down the other end of the second up-down member 523. Because the second up-down member 523 is rotated about an intermediate portion connected to the supporting member 524 in accordance with the pull-down motion of the other end of the second up-down member 523, one end is ascended on the contrary. According to ascending of one end of the second up-down member 523, the rotating member 521 connected to one end of the up-down member 523, and the shaft member 5121 connected to the rotating member 521 are ascended too. When the shaft member 5121 ascends, the other side of the connecting member 512 ascends too, and one end of the second link 511 connected to the other side of the connecting member 512 also ascends. When one end of the second link 511 ascends, the second link 511 pushes the front rotating portion 22 by a predetermined angle to upper-forward direction, and as the first link 4 is moved by a distance corresponding to the distance traveled by the front rotating portion 22 to the upper-forward direction, the rear rotating portion 32 connected to the first link 4 is rotated to lower-forward direction and pulled.

As a result of interactions among the respective components, the natural up-down motion is implemented, in which the front side of the multi-legged robot is lifted up more than the rear side when the multi-legged robot raises its front legs.

Referring to change from position ② to position ③ where the robot lands its front legs, the up-down driving portion 53 is expanded in a lengthwise direction, thereby pushing up the other end of the second up-down member 523. When the other end of the second up-down member 523 is pushed upward, the second up-down member 523 rotates about the intermediate portion connected to the supporting member 524, and one end is descended on the contrary. When one end of the second up-down member 523 descends, the rotating member 521 connected to one end of the up-down member 523 and the shaft member 5121 connected to the rotating member 521 descend, too. When the shaft member 5121 descends, the other side of the connecting member 5121 descends, and one end of the second link 511 connected to the other side of the connecting member 512 also descends. When one end of the second link 511 descends, the second link 511 pulls down the front rotating portion 22 to lower-backward direction by a predetermined angle, and the first link 4 is moved by a distance corresponding to the distance traveled by the front rotating portion 22 to the lower-backward direction. As a result, the rear rotating portion 32 connected to the first link 4 is pushed up to the upper-backward direction in rotating motion.

As a result of interactions among the respective components, the natural up-down motion is implemented, in which the front side of the multi-legged robot is leaned forward more than the rear side when the multi-legged robot lands its front legs.

Referring to change from position ⑤ to positions ⑥, ⑦, because the front side of the multi-legged robot is leaned forward more than the rear side, i.e., because the rear side is lifted up more than the front side, the interactions among the respective components may be carried out in a similar manner as in the case of changing from position ② to position ③ where the robot lifts up the front legs. Accordingly, this will not be repeatedly explained.

Figure 4:
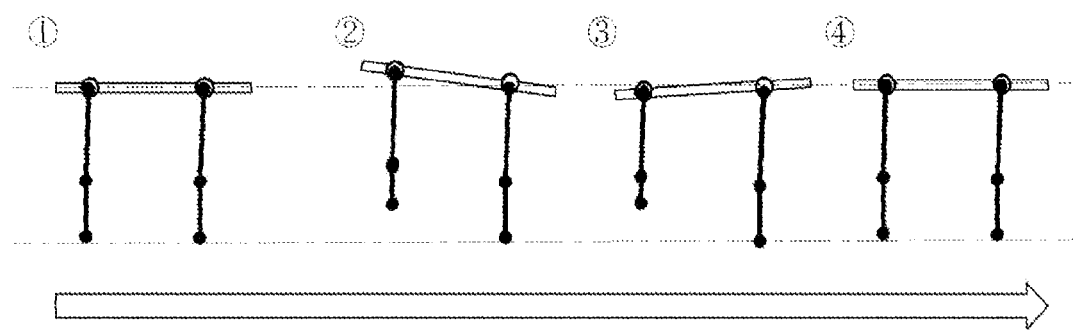
FIG. 4 is a schematic conceptual view illustrating, in stepwise manner, a motion of a multi-legged robot by a multi-legged apparatus according to an embodiment viewed from the back.

FIG. 4 is a schematic conceptual view illustrating, in stepwise manner, a motion of a multi-legged robot by a multi-legged apparatus according to an embodiment viewed from the back.

Considering that the multi-legged robot can have a predetermined degree of lateral twisting at shoulders, body, hips, or the like, depending on the step of the robot (e.g., depending on whether the robot steps forward with its left legs or right legs), the multi-legged apparatus 100 according to an embodiment is so designed to allow a predetermined degree of twisting, thereby providing more natural operation.

That is, because the up-down motion is controlled via controlling of the up-down driving portion 53 to operate in accordance with the stepping movement of the multi-legged robot, more active operation is implemented. However, the twist motion in a lateral direction is not actively controllable by the separate driving part such as the up-down driving portion 53. That is, the twist motion is rather manually implementable via a structure which is capable of naturally accommodating the twisting generated during the motion of the multi-legged robot.

Referring to FIG. 4, the interactions among the following components may implement the twist motion such as raising of the left hip (or shoulder) at position ②, or raising of right hip (or shoulder) at position ③.

When the robot raises the left legs as in the case of position ②, among the two second links 511, the second link on the left side may be pulled up to the upper-forward direction. When the second link on the left side is pulled up to the upper-forward direction, the link portion 51 and the body 11 are slightly twisted from the left side (left-upper side) to the right side (right-lower side). However, because the up-down portion 52 rotatably connected to the shaft member 5121 to be rotated vertically is relatively rotated with respect to the shaft member 5121, twist motion does not occur. As a result, the natural twist motion is implemented between the link portion 51 and the body 11 and the up-down portion 52.

Further, if the robot lands its right legs as in the case of position ③, among the two second links 511, the second link on the left side may be pulled down to the lower-forward direction. When the second link on the left side is pulled down to the lower-forward direction, the link portion 51 and the body 11 are twisted slightly from the left side (left-lower side) to the right side (right-upper side). However, because the up-down portion 52 rotatably connected to the shaft member 5121 to be rotated vertically is relatively rotated with respect to the shaft member 5121, twist motion does not occur. As a result, the natural twist motion is implemented between the link portion 51 and the body 11 and the up-down portion 52.

Because the multi-legged apparatus enables the multi-legged robot to provide a natural motion, the apparatus is industrially applicable to various fields including performances, movies, etc.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A multi-legged apparatus, comprising:
    a body portion including a body;
    a front leg portion including a front fixing portion fixed to the body, and a front rotating portion rotatably connected to the front fixing portion;
    a rear leg portion including a rear fixing portion fixed to the body and a rear rotating portion rotatably connected to the rear fixing portion; and
    a first link connected, at both ends, to the front and rear rotating portions, respectively,
    wherein the body portion further comprises a driving portion which rotates one of the front and rear rotating portions,
    wherein the driving portion comprises:
    a link portion comprising a connecting member rotatably connected at one end to the body to be rotated in a lateral direction, and a second link rotatably connected at one end to the other side of the connecting member and rotatably connected at the other end to one of the front and rear rotating portions;

an up-down portion rotatably connected to the other side of the connecting member to be rotated in a vertical direction; and an up-down driving portion which vertically moves a portion of the up-down portion connected to the other side of the connecting member.

2. The apparatus of claim 1, comprising two second links, wherein
one of the two second links is connected at both ends to a left side of the other side of the connecting member and to a left side of the front rotating portion, and
the other of the two second links is connected at both ends to a right side of the other side of the connecting member and to a right side of the front rotating portion.

3. The apparatus of claim 2, wherein the up-down driving portion comprises a hydraulic actuator.

4. The apparatus of claim 1, wherein the connecting member comprises a shaft member extended vertically from the other side, and the up-down portion comprises a rotating member which is rotatably connected to both ends of the shaft member to be rotated in a vertical direction.

5. The apparatus of claim 4, wherein the up-down driving portion comprises a hydraulic actuator.

6. The apparatus of claim 4, wherein the up-down portion comprises:
a first up-down member rotatably connected at one end to an upper end of the rotating member to be rotated in a lateral direction;
a second up-down member rotatably connected at one end to a lower end of the rotating member to be rotated in a lateral direction; and
a supporting member rotatably connected to the other end of the first up-down member to be rotated in a lateral direction and connected to an intermediate portion of the second up-down member to be rotated in a lateral direction, wherein
the up-down driving portion is rotatably connected at one end to the other end of the second up-down member to be rotated in a lateral direction, and is rotatably connected at the other end to the supporting member to be rotated in a lateral direction.

7. The apparatus of claim 6, wherein the supporting member is connected to the first and second up-down members so that the first and second up-down members are arranged side by side.

8. The apparatus of claim 6, wherein the second up-down member comprises a damper connected to the supporting member.

9. The apparatus of claim 6, wherein the up-down driving portion comprises a hydraulic actuator.

10. The apparatus of claim 1, wherein the up-down driving portion comprises a hydraulic actuator.

11. The apparatus of claim 7, wherein the up-down driving portion comprises a hydraulic actuator.

12. The apparatus of claim 1, wherein the front rotating portion is rotatable in a lateral direction with respect to the front fixing portion,
the rear rotating portion is rotatable in a lateral direction with respect to the rear fixing portion, and
the driving portion is rotatable in a lateral direction with respect to one of the front and rear rotating portions.

13. The apparatus of claim 8, wherein the up-down driving portion comprises a hydraulic actuator.

* * * * *